United States Patent [19]

Becker

[11] Patent Number: 4,544,082

[45] Date of Patent: Oct. 1, 1985

[54] SEPARATING AND DEPOSITING SINGLE PIECES OF GRAIN

[75] Inventor: Reinhard Becker, Oberweser, Fed. Rep. of Germany

[73] Assignee: Karl Becker GmbH & Co. KG, Oberweser, Fed. Rep. of Germany

[21] Appl. No.: 405,398

[22] Filed: Aug. 5, 1982

[30] Foreign Application Priority Data

Aug. 10, 1981 [DE] Fed. Rep. of Germany ....... 3131620

[51] Int. Cl.4 ............................................. A01C 7/04
[52] U.S. Cl. ................................... 221/200; 111/34; 221/278
[58] Field of Search .............. 221/278, 289, 292, 293, 221/200, 251, 290, 303, 307, 310, 211; 222/263, 636, 637, 461, 462; 406/124, 130, 131, 136, 137, 146; 111/34, 77

[56] References Cited

U.S. PATENT DOCUMENTS 3,179,134 4/1965 Sigrist ............................ 222/630 X
3,214,060 10/1965 Stricker et al. ...................... 221/200
3,715,057 2/1973 Becker ................................ 221/211
3,770,164 11/1973 Hembree ............................ 221/211

FOREIGN PATENT DOCUMENTS 1216140 11/1959 France ............................... 222/503

Primary Examiner—F. J. Bartuska
Attorney, Agent, or Firm—Ralf H. Siegemund

[57] ABSTRACT

A funnel-shaped device is provided with one or two segments serving as brackets to enlarge the bottom opening of the funnel which, when closed, is smaller than the smallest piece of grain to be deposited; a centrally disposed air tube blows air axially toward the bottom opening to cause a single piece of grain to be aerodynamically held on the opening while the remainder of the grains hover at a higher level. A slide element such as a fork or the like can be removably disposed at an intermediate level, possibly to serve for opening a single-bracket element. This permits a lower hovering level and a correspondingly increasing cycle time and depositing rate.

8 Claims, 12 Drawing Figures

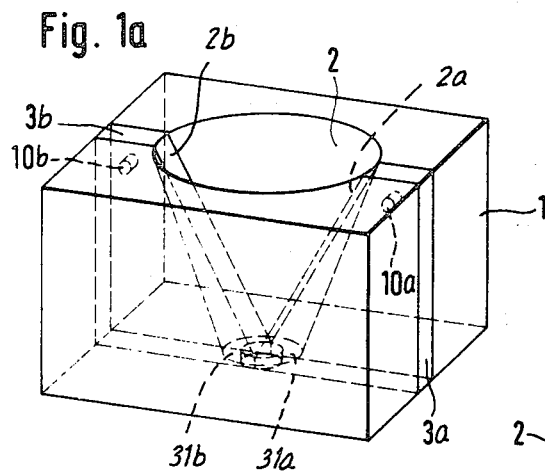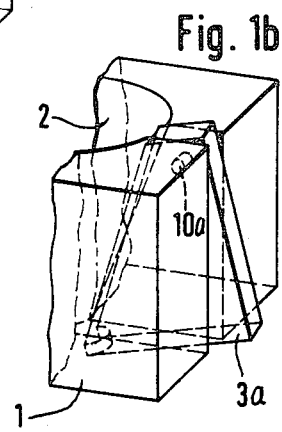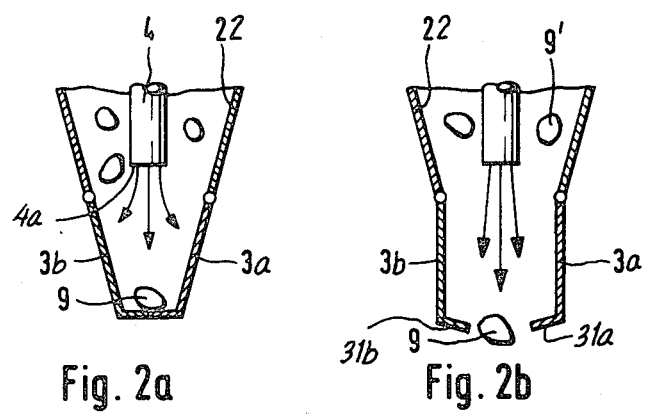

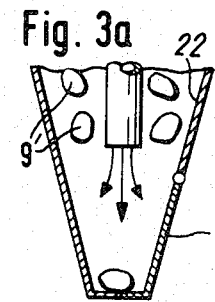
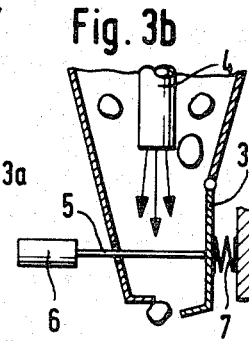
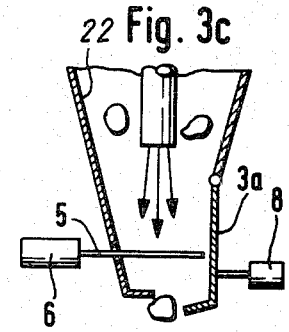
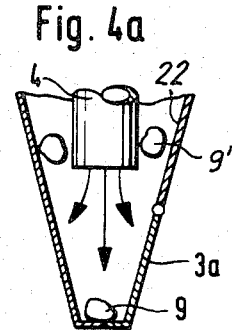
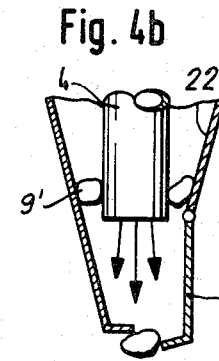
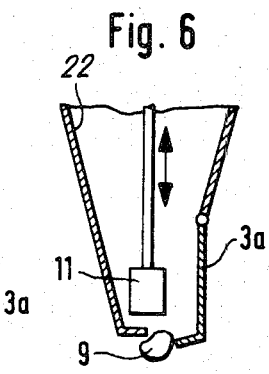
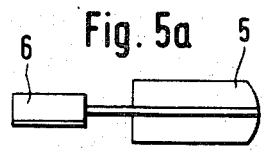
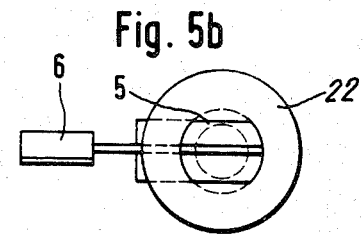

SEPARATING AND DEPOSITING SINGLE PIECES OF GRAIN

BACKGROUND OF THE INVENTION

The present invention relates to a device for separating and depositing individual grains, particularly seeds, under utilization of a funnel and an air flow by means of which all but one pieces of grain are blown out of the funnel, and subsequently, the lower portion of the funnel is opened, permitting the single piece of grain to fall out.

My copending patent application, Ser. No. 088,866, filed on Oct. 29, 1979, discloses a device for that purpose, in which the lower portion of the funnel is constructed as a pair of brackets, defining the funnel-shaped chamber with a narrow duct opening that is too small to permit a single piece of grain to fall through.

Upon opening the funnel by pivoting at least one of the bracket elements, the duct is widened temporarily, and that one particular piece of grain can now fall out. The aerodynamics of the system is such that, with closed brackets and a narrow duct opening only one piece of grain can, indeed, be retained in the bottom of the funnel while all others are blown out and retained in a hovering state by the introduction of an air current. The principle of operation, as far as the singling out and separating one grain from the others is concerned, results from the fact that the bottom duct of the funnel is partially, but not completely, closed by one piece of grain; and upon blowing air into the funnel, a certain venturi effect takes place around the surface of that one piece of grain, causing a low pressure to surround same and sucking it thereby, in effect, against the funnel wall adjacent to the duct. On the other hand, no such retension force is available to the other pieces of grain, which are, in effect, blown out by the airflow. In particular, not all of the air being blown into the funnel escapes through the duct, but a sizable portion is deflected and flows up again; and the other pieces of grain are, aerodynamically forced to follow that flow.

The operation of such a device is highly dissatisfactory and the retension of a single piece of grain as well as its separation from other grains is a consistently and reliably carried-out operation. The pieces of grain, being carried upward by the airflow, will, of course, begin to fall when the brackets are opened. Speedy reclosing of the brackets is required so that, when the lowest-most of the falling grains has dropped by a significant distance, the bracket and funnel must be closed so that only the previously retained grain will fall out and not any of the others. This operation is also a highly reliable one. It was found, however, that the rate of deposing pieces of grain in a sequential operation, as it is carried out by a planter, is limited to some extent simply because a certain margin of safety is required for blowing the grains up and sufficiently high so that, with certainty, none of them will fall through while the brackets are open.

In view of the irregularity and shape inherent in seeds, in many instances, one does need a significant margin of safety here, which, of course, means that a certain time elapses until a another grain again becomes situated on top of the duct in the reclosed bracket structure and another period of time will elapse, during which the other pieces of grain are blown out again.

DESCRIPTION OF THE INVENTION

It is an object of the present invention to improve grain-depositing devices, such as planters (as disclosed and claimed in my copending application, Ser. No. 088,866) without compromising the safety of operation and, particularly, without compromising the reliability as far as single-grain depositing is concerned, but to increase the rate of depositing.

Therefore, it is an objective of the present invention to improve single-grain depositing devices such as planters which are comprised of a funnel, the lower portion of which is being constructed or includes brackets permitting the temporary opening of the funnel, but when closed, providing a bottom duct having dimensions of smaller than the smallest expected piece of grain.

In accordance with the preferred embodiment of the present invention, the device, as per the object statements above, is improved by providing an air-blowing tube which penetrates the interior of the funnel to run air current into and toward the lower portions of the brackets. The air current so introduced flows vertically, i.e., along the longitudinal axis of the funnel. Opening and closing of the brackets modify the airflow from the air-injecting tube, and that modification controls, in fact, the singling out and separation of one grain from the others as well as the depositing of that one piece to the exclusion of the others at that instant. The airflow speed should be deemed critical simply for purposes of obtaining a rather high rate of depositing. The funnel interior is pressurized by that airflow, and it was found that even a minute excess pressure, i.e., above atmospheric pressure, suffices to blow all but one piece of grain out of the funnel. Unlike in the device of my copending application, the air is not blown along the wall of the funnel, which means that the overall flow pattern as per the present device is more symmetrical, and the conditions under which the individual pieces of grain are blown out of the funnel are more uniform The air, of course, leaves the funnel mostly through the upper opening, carrying the individual pieces of grain with the exception of the one that is retained on the bottom opening of the funnel. While the grains hover above the lower funnel portion, the brackets are opened; they are pivoted by an angle just barely sufficient to permit one piece of grain to drop. This changes the airflow conditions drastically because the tube now blows air directly toward the enlarged bottom opening so that very little air flows out of the funnel in upward direction. The previously hovering pieces of grain do drop. That operation is similar to the one described in my copending application. However, the air blown out of the tube causes the one piece of grain to be accelerated. In other words, the previously detained single piece will not just drop out of the funnel when the brackets open; but the airflow directed by the injection tube against that one piece of grain blows it literally out of the funnel so that total acceleration exceeds mere gravity However, it should be noticed that this is a controlled operation. The one piece of grain is not blasted toward the ground. As soon as the grain has passed the lowermost portion of the opened brackets, the brackets are reclosed and another cycle begins. Since the other pieces of grain have been blown sufficiently high, they will not fall through, i.e., they will not reach the opening as provided by the pivoted-away brackets. The hovering height of the pieces of grain being blown out of the funnel can be reduced during opening of the bracket or brackets. A mechanical lock or barrier is provided above the one grain retained at the bottom opening of the funnel, but just sufficient to make sure that none of the other pieces of grain can likewise fall. This then permits the hovering height to be lowered considerably; one does not have to provide anymore sufficiently high air pressure which with certainty holds all of the pieces of grain well above the opened bracket. Therefore, the speed of depositing can be increased.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIG. 1a is a prospective view, somewhat schematically, of a funnel with openable brackets, but shown in a closed position;

FIG. 1b is a portion of FIG. 1a, but showing a bracket element in a funnel-opening disposition;

FIGS. 2a and 2b are schematic views of a double-bracket operation with an air-injection tube in accordance with the preferred embodiment of the present invention for practicing the best mode thereof;

FIGS. 3a, 3b, and 3c show somewhat schematically single-bracket versions, coupled with a mechanical barrier for stopping the dropping of grains when the bracket element is open;

FIGS. 4a and 4b are likewise schematical views of another example of a single-bracket version with a larger, vertically displaceable air-injecting tube;

FIG. 5a is a somewhat schematic view of a barrier element, usable in the device shown in FIGS. 3a, 3b, and 3c;

FIG. 5b is a top view of the device shown in FIGS. 3a and 3b; and

FIG. 6 is a somewhat schematic illustration of a modified version, using supplemental, mechanical ejection for a single piece of grain.

Proceeding now to the detailed description of the drawings, FIG. 1 illustrates a funnel element and body comprised of housing 1, in which a frustoconical surface 2 is provided to establish the funnel. A portion of that surface is established by surface increments 2a and 2b, pertaining to bracket elements 3a and 3b respectively pivotably hinged by means of hinge pins 10a and 10b. One can say that geometrically the hinge and bracket elements 3a and 3b result by cutting two slices out of the block 1 and in a symmetrical relation to a plane that traverses the axis of the funnel surface. The lower opening 12 of the funnel 2 is smaller than the smallest grain or other piece to be deposited, provided the brackets are closed. The width of the brackets, which is the width of the hypothetical slice mentioned above, is a little wider than opening 12 so that seats or ledges 31a and 31b are established. A small, pivotable displacement suffices to widen that opening to exceed the grain dimensions; the open position of bracket 3a shown in FIG. 1b, is actually exaggerated for purposes of illustration. In reality, a much smaller pivot angle suffices.

The air-injecting tube has been omitted from FIGS. 1a and 1b for the sake of clarity, but is shown in FIGS. 2a, et seq. FIGS. 2a and 2b show, somewhat schematically, the bracket elements 3a and 3b as well as the platforms mentioned above 31a and 31b. In addition, an upward extension of the funnel is shown, denoted by reference numerals 22 but omitted in FIGS. 1a and 1b. The air-blowing and injecting tube 4 is provided centrally to the funnel and particularly to the funnel axis. This tube 4 has a lower opening 4a, directing the airflow centrally toward the opening 12 in the bottom of the funnel. That opening 12 is, however, normally closed to a considerable extent by one piece of grain, such as 9. The airflow is to a considerable extent deflected in a symmetrical fashion, causing the other pieces of grain 9' to be blown out of the funnel and to be held in a hovering state well above the bracket. The one piece 9 in the bottom portion is sucked by airflow around its regular surface against the annular platform 31a and 31b.

FIG. 2b illustrates a slight opening state of the brackets 3a and 3b, causing the bottom opening to be enlarged and one piece of grain 9 will fall out. That falling operation is aided by the modified airflow from the injection tube 4 which causes a predominant portion of the air to blow toward the grain 9 and around the grain pushing it out of the funnel, in addition to the force of gravity that acts on that one piece of grain 9. The other pieces of grain 9' have been blown high enough so that during the opening phase, as depicted in FIG. 2b, they will not fall all the way to the bottom of the funnel. Accordingly, the brackets 3a and 3b are opened only briefly and they reclose before the other pieces of grain have traversed the total height of the funnel. That height does not have to be as large as the height in my copending application because the period of opening the brackets can be shorter due to the accelerating effect imparted by the air from tube 4 upon the one piece of grain. However, this improvement and increase in the rate of depositing now permitted is still a limited one; further increase in the rate of depositing, that means in the frequency of the opening and closing cycles for the brackets, requires that the hovering height of the pieces of grain be lowered, and this requires additional measures to be taken, as shown in FIGS. 3a, 3b, and 3c. These figures show a single bracket structure, in other words, only one of the brackets such as 3a is provided; the funnel is closed otherwise. That particular bracket 3a is operated by a grid element 5, shown in partial elevation in FIG. 5a, which is operated by a solenoid 6. This solenoid pushes the forklike element 5 into the funnel opening and against the bracket element 3a, opening it against the force of a spring 7. The slide 5 has individual screening bars which are placed at a distance just sufficient that individual grains cannot fall through. Moreover, the outer boundary portion of element 5 is chosen so that the spacing between it and the wall of the funnel at the particular level at which it is operated is also smaller than the smallest grain.

Normally, the slide 5 is retracted fully and the interior of the funnel is unobscured. In this case, the operation is the same as described. But now, the pressure of air and the flow provided by the tube 4 needs to be merely sufficient to blow the other pieces of grain above the level in which the slide 5 operates. The one singled-out piece of grain is, of course, retained in the bottom of the funnel as described. As the bracket is opened by advancing slide 5, it can be seen that before any modification in the airflow occurs, due to the retraction of bracket 3a, the slide 5 is fully disposed within that space. As slide 5 hits bracket 3a and opens the bracket, the one piece of grain will fall out and the others may fall in parts on top of slide 5 and are retained thereon and prevented from falling further. As the slide 5 begins to retract, it remains in a seed- and grain-holding position until the bracket is again completely closed. Upon further retraction of slide 5, these pieces of grain may fall onto the bottom of the funnel; one of the pieces will cover the opening 12, and the others will be blown up again by the airflow. As stated, however, the hovering needed for successful operation is significantly reduced over the hovering height needed in the embodiment as per FIGS. 2a and 2b and per my copending application. Accordingly, the rate of depositing attainable with that structure is higher.

FIG. 3c illustrates a modification in that the slide 5 does not fulfill the function of bracket opening, but a separate drive 8 is provided. In this case, the slide 5 will not be advanced all the way to the bracket, but will remain at a certain distance therefrom. The bracket opening is phased to the operation of slide advance such that appropriate timing can be observed. It can be seen that the embodiment of FIG. 3c operates with two smaller drives rather than one larger one as per FIG. 3b.

An interesting embodiment is shown in FIGS. 4a and 4b, in which the air-blowing tube 4 fulfills also the seed-retaining function of the slide which, therefore, can be omitted in this case. The tube 4' is shown here to be wider and is height-adjustable. FIG. 4a illustrates a normal position, in which the blowing tube 4 is in a more upper position and it is, therefore, spaced from the conically shaped funnel wall sufficiently, and pieces of grain can fall through that gap. After the pieces of grain as per FIG. 4a have attained a sufficient hovering height, tube 4' is lowered to a position shown in FIG. 4b. Now, the lower edge of tube 4' is spaced to the tapering funnel wall at a distance smaller than the smallest diameter of any grain. Therefore, a barrier is set up which cannot be traversed by the hovering pieces of grain. The bracket 3a (or both of them, the principle shown here is applicable to a single- or double-bracket arrangement) can now be opened; the one piece of grain falls out, but the others are prevented from dropping further. Following reclosing of the bracket, the tube 4' is retracted, and another cycle begins.

FIG. 6 illustrates another modification, in which the device or any of the devices shown in FIGS. 2a, 3a or 4a are supplemented by an ejector 11. In fact, the tube 4 or 4' can double as an ejector, being driven by its own drive and pushing the one piece of grain at the bottom of the funnel out of the funnel at a rate in excess of normal gravity acceleration.

The inventive design and concept is subject to a number of modifications. For example, in lieu of a slide such as 5, one can use a star which is provided laterally at the funnel such that it can be rotated into the funnel and out again to serve as a barrier. The arms of this vertically oriented star are rythmically introduced into the funnel beginning from below and up and in synchronism with the opening of the bracket and closing thereof. The ejector can be provided as a punchlike element which forces the lowest piece of grain out of the opening provided by the swung-open bracket or brackets and, in that position, the punch, in effect, prevents the other pieces of grain to reach the bottom of the funnel. The various drives described above have been described as solenoids, i.e., as electromagnetic drives; but one can use hydraulical or pneumatical control devices, or one can use mechanical cam operation. As far as the barrier is concerned, a sieve or perforated sheet can be used in lieu of the fork.

The operation and timing thereof has to take into consideration that a fast opening and closing is required. However, it was found to be of advantage to provide for faster opening of the brackets, followed by a delay of closing and somewhat slower operation so that the gap below is retained a little longer period. This means that in these last closing phases no longer hovering grains are, in fact, accelerated in down direction. One will choose such timing if a physical barrier is provided, such as a slide.

The slide will remain effective as a barrier when the opening of the bracket is partially closed so that with certainty the now downwardly accelerated, previously hovering, grains will lodge on the barrier, but will definitely not go further. Subsequently, the slide is quickly receded, and the bracket closes likewise completely; one grain will drop onto and lodge above the opening; the others will first fall on top, but the cycle will be repeated and the renewed upflow carries these grains up again. In any event, one has to be sure by the sequencing of the operation that the grains can fall below this slide plane only after the bracket has, in fact, closed. One may also provide a supplemental bore which is ruthmically opened and closed by means of a flap control and delayedly opens upon closing of the bracket.

The preferred embodiment of the invention, the objects and features of the invention, and further objects, features and advantages thereof, will be better understood from the following description taken in connection with the accompanying drawings.

I claim:

1. An apparatus for separating individual pieces of grain from others and depositing the separated pieces sequentially and individually, there being a funnel-shaped device having a bottom opening smaller than the smallest piece of grain, the improvement comprising:
    a bracket means for temporarily enlarging the opening;
    slide means, being permeable to air and provided for being temporarily disposed above the enlarged opening, in a particular level; and
    means for blowing air into the interior of the funnel sufficient to cause pieces of grain to hover above said level for a closed bracket means while one grain covers the opening.

2. The apparatus as in claim 1, the means for blowing being a tube, centrally disposed in relation to the funnel and directing air toward the opening.

3. The apparatus as in claim 1, the bracket means being a single-bracket element.

4. The apparatus as in claim 3, the bracket element or segment being actuated by the slide.

5. The apparatus as in claim 4, the slide having individual prongs and defining a grid-like barrier which the pieces of grain cannot traverse.

6. The apparatus as in claim 5, the slide being dimensioned so that its distance from the funnel is smaller than the smallest grain.

7. The apparatus as in claim 5, the slide pushing the single-bracket element for opening it.

8. The apparatus as in claim 5, there being separate drive means for the slide and for the bracket element.

* * * * *